No. 659,587. Patented Oct. 9, 1900.
G. H. IRISH.
TABULATING ATTACHMENT FOR TYPE WRITERS.
(Application filed May 19, 1900.)
(No Model.) 3 Sheets—Sheet 1.
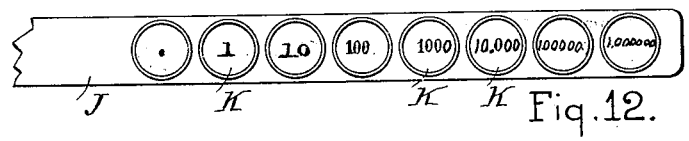
Fig. 12.
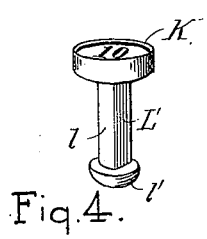
Fig. 4.
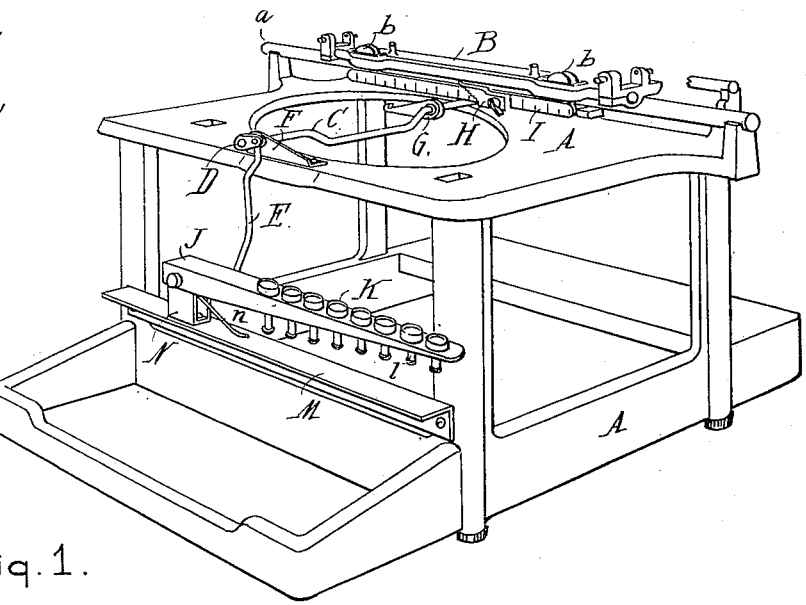
Fig. 1.
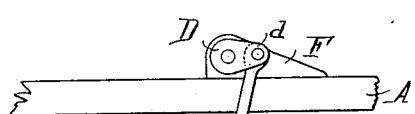
Fig. 2.
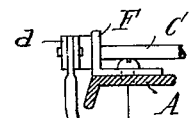
Fig. 3.
Witnesses, Inventor,
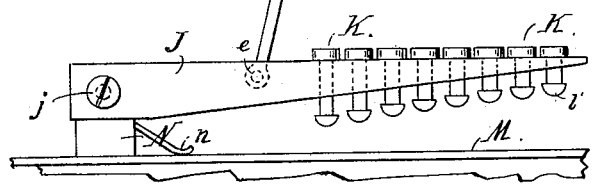

No. 659,587. Patented Oct. 9, 1900.
G. H. IRISH.
TABULATING ATTACHMENT FOR TYPE WRITERS.
(Application filed May 19, 1900.)
(No Model.) 3 Sheets—Sheet 2.

Witnesses, Inventor,
W. M. Holland. Gilbert H. Irish,
By Louis Bagger & Co.
Attys.

THE NORRIS PETERS CO., PHOTO-LITHO., WASHINGTON, D. C.

No. 659,587. Patented Oct. 9, 1900.
G. H. IRISH.
TABULATING ATTACHMENT FOR TYPE WRITERS.
(Application filed May 19, 1900.)

(No Model.) 3 Sheets—Sheet 3.

WITNESSES:
F. L. Ouraud.
E. R. Bunyea.

INVENTOR:
Gilbert H. Irish,
BY Louis Bagger & Co.
ATTORNEYS.

UNITED STATES PATENT OFFICE.

GILBERT H. IRISH, OF DALLAS, TEXAS.

TABULATING ATTACHMENT FOR TYPE-WRITERS.

SPECIFICATION forming part of Letters Patent No. 659,587, dated October 9, 1900.

Application filed May 19, 1900. Serial No. 17,288. (No model.)

*To all whom it may concern:*

Be it known that I, GILBERT H. IRISH, a citizen of the United States, residing at Dallas, in the county of Dallas and State of Texas, have invented new and useful Improvements in Tabulating Attachments for Type-Writers, of which the following is a specification.

My invention relates to tabulating attachments for type-writers; and the objects of the same are to provide simple, reliable, and efficient means for printing long lists of figures or statistics, such as tables and statements, in a neat, rapid, and economical manner.

My attachment may be applied to any of the well-known or standard type-writers.

I attain the objects referred to by means of the construction shown in the accompanying drawings, which form a part of this specification, and in which—

Figure 5:
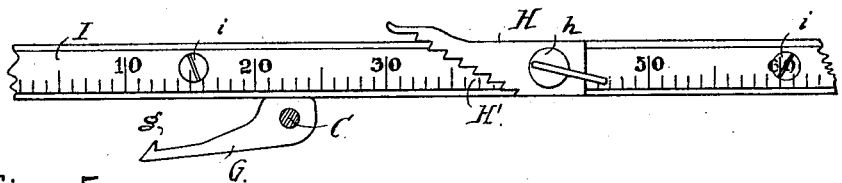
Figure 6:
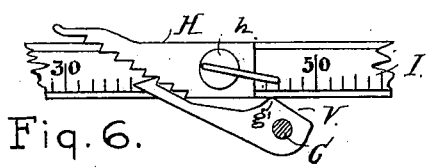
Figure 8:
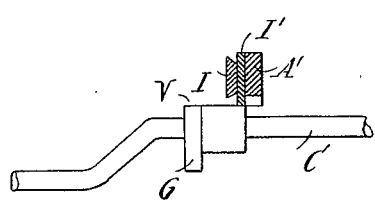
Figure 7:
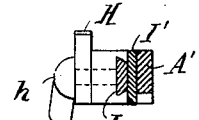
Figure 13:
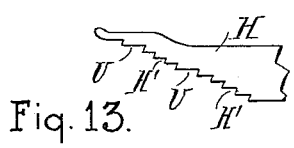
Figure 9:
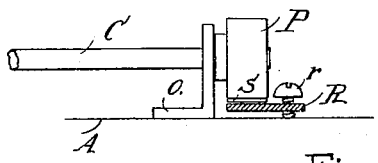
Figure 10:
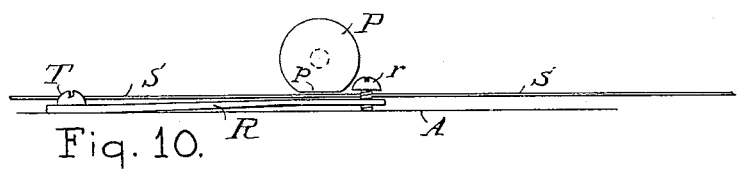
Figure 11:
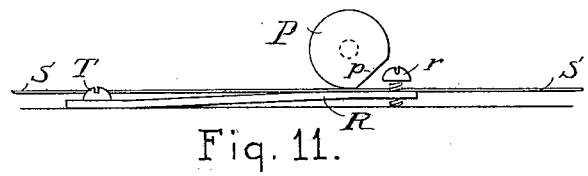
Figure 14:
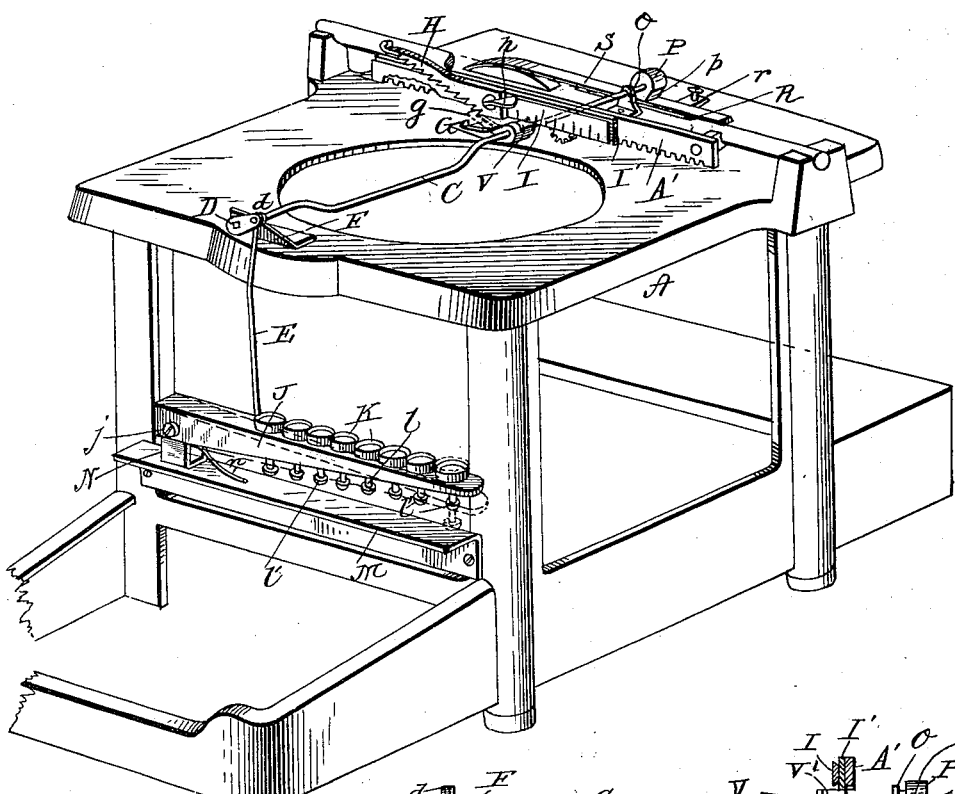
Figure 15:
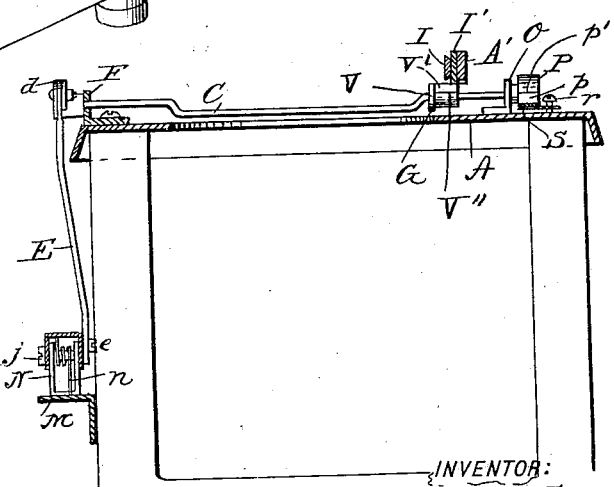

Figure 1 is a perspective view of a type-writer frame, showing my attachment secured thereto. Fig. 2 is a front view of a portion of a type-writer frame, showing the main key-bar and the keys. Fig. 3 is a sectional view through the frame of the machine, showing the connections to the key-bar. Fig. 4 is a perspective of one of the keys. Fig. 5 is a front view of a portion of the scale with the stepped stop mounted thereon and the pawl adjacent thereto. Fig. 6 is the same as Fig. 5, but with the pawl engaging the stepped stop. Fig. 7 is a vertical section through the scale. Fig. 8 is a similar section through the scale, showing the pawl in the position it occupies when the tabulating attachment is not in use. Fig. 9 is a side view of the brake which I may use. Fig. 10 is an end elevation of the brake in disengaged position. Fig. 11 is an end elevation of the brake when in operative position. Fig. 12 is a plan view of the key-bar and keys. Fig. 13 is a fragmentary detail of a modified form of the stepped stop which I may employ. Fig. 14 is a perspective view of a type-writer frame with my attachment mounted thereon. Fig. 15 is a vertical section of the same.

Like characters of reference designate like parts wherever they occur in the different views.

In said drawings, A designates the frame of an ordinary model of type-writer. Attached to the front portion of the frame A is a supporting bar or bracket M, and mounted on this bracket is a support N. Pivotally supported on N and secured by the screw or pintle $j$ is a key-bar J, provided with a spring $n$. On the long arm of the key-bar J a series of keys K are mounted in apertures. As shown in Fig. 12, these keys correspond to the places of numeration from units to millions and one to the decimal-point, there being eight keys in all. It will be obvious that any number can be used by making very slight changes in the mechanism to correspond. The shanks L' of these keys are squared to prevent them from turning in the key-bar. They are also provided with knobs $l'$ to hold them from being forced out when the bar is operated. It will be noted upon reference to Figs. 2 and 14 that these keys vary in length and are graduated from the outer end of the key-bar to the inner. The shortest key corresponds to the millions, and so on down. The keys K are free to slide longitudinally, and the shortest key corresponds to the longest throw of the bar, and reversely. It will be obvious that the object attained by using keys of different lengths is a graduated series of throws of the rock-shaft. This, however, can also be accomplished by employing keys of equal lengths, since the farther the key is from the pivot the shorter the throw of the key-bar would be, since the key is held firmly in contact with the key-bar until released.

Connected to the key-bar J by a pivot $e$ is a connecting-rod E. This connecting-rod extends upward and is oppositely connected to a crank D by a crank-pin $d$. The crank D is keyed to a rock-shaft C, journaled in brackets F and O, supported on the frame A. The rock-shaft extends across the frame and has secured to its end a brake mechanism to be hereinafter described. Supported on the rock-shaft about the middle thereof and keyed thereto is a pawl G, which is provided with a cam V. The cam V is cylindrical in form; but one side is cut away, thereby forming a face V' and shoulders V''. When the pawl is in a horizontal position, the face is also horizontal.

The letter B designates a portion of the carriage of ordinary design of a type-writer. Mounted on this carriage is a scale I of modified construction. This scale-bar has a dovetailed cross-section I', formed by oppositely beveling the edges. Mounted in the dovetail grooves and adapted to slide therein is a stepped stop K. This stepped stop is fitted with a series of beveled teeth H', arranged in an inclined row, and is clamped in position by a thumb-screw h. This construction enables the stop to be clamped in any position on the scale I. The pawl is so positioned on the shaft C in reference to the stepped stop that it can engage any of the teeth on the stop after being raised by actuating the shaft. By this arrangement the carriage can be stopped by the pawl at any position desired, depending on the position of the stop and the amount the pawl is raised by actuating said rock-shaft. The portion B of the carriage is adapted to be tilted up by revolving it about the axis a, on which it is free to move longitudinally, as is usual. The carriage is also provided with the now common rack-bar A' and a pinion X, adapted to engage said rack to feed the carriage along during its normal operation. In operating my attachment the rack is lifted out of engagement with the pinion X by the action of the cam.

To prevent the carriage from launching too suddenly to the left on being released from the pinion X, I provide a brake. This brake comprises a spring-plate R, secured to the frame A of the type-writer beneath the feed or carriage spring S, in combination with a cam P, provided with a flat face p, keyed to the end of the rock-shaft at a point just above the spring S. The spring R is secured by a screw T and is provided with a set-screw r to regulate the height of the spring, and thereby the grip of the brake. The flat face p of the cam P is normally parallel to the spring S, so as not to interfere with the usual operation of the type-writer; but when the tabulating attachment is operated and the carriage released by the action of the cam V the brake is simultaneously set. When set, it assumes the position shown in Fig. 11, with the shoulder p' bearing on the spring S.

In operating my device the stepped stop is first set in the desired position on the scale-bar corresponding to the position to be occupied on the paper by the column of figures to be printed. The notch at the right of the stepped stop—that is, the lower one—is set to correspond with the decimal-point, if there is to be one. Suppose, for example, that it is desired to print "200.00." To do this, the fourth key from the left of the key-bar is depressed until it comes in contact with the bracket M. The motion of the bar L will be communicated to the rock-shaft by the connecting-rod E. The rotation of the shaft C simultaneously raises the pawl G up into position to engage the fourth tooth from the bottom on the stop, actuates the cam V, which tilts up the carriage and disengages the pinion from the rack-bar, and sets the brake. The carriage will now launch to the left, but will be retarded by the action of the brake sufficiently to prevent the machine from being injured. It will continue its travel until the pawl engages the before-mentioned tooth on the stop. The key K is now released, when the reaction of the spring n will restore the mechanism, including the pawl G, to its normal position, with the pinion X engaging the rack-bar. The numeral "2" can now be printed by the use of the corresponding key on the regular keyboard and the naughts filled in in the usual manner, after which the decimal-point can be added and then two more naughts. The platen-roll can now be actuated and the operation repeated for the next number.

The modified form of stepped stop shown in Fig. 13 is provided with greater intervals U between some of the teeth H', so that commas may be introduced between the figures at these points, if desired.

It will appear from the foregoing that the use of my attachment will not interfere with the customary use of the type-writer.

Having described my invention, what I claim as new, and wish to secure by Letters Patent, is—

1. In a tabulating attachment for type-writers, a key-bar pivotally supported and provided with a series of keys mounted to slide longitudinally and positioned above a base with which they are adapted to contact, in combination with a rock-shaft connected to said key-bar and carrying a pawl, and a stepped stop mounted on the scale of the type-writer and positioned to be engaged by said pawl, substantially as described.

2. In a tabulating attachment for type-writers, a key-bar pivotally supported, a series of keys having shanks of different lengths mounted to slide in apertures in said key-bar, and positioned above a base with which they are adapted to contact, a rock-shaft connected to said key-bar, a pawl keyed on said rock-shaft, a stepped stop adjustably mounted on the scale of the type-writer, and a friction device mounted on said rock-shaft and adapted to retard the movement of the carriage, substantially as described.

3. In a tabulating attachment for type-writers, a key-bar pivotally supported at one end, a number of keys of different lengths mounted in said key-bar, and positioned above a base with which they are adapted to contact, a rock-shaft, a connecting-rod connecting said rock-shaft and said key-bar, a pawl on the rock-shaft, a stepped stop adjustably mounted on the scale of the type-writer and positioned to be engaged by said pawl, and a friction device for retarding the movement of the carriage, said friction device comprising a cam having a plane face and secured to the rear end of the rock-shaft above the carriage-spring of the type-writer and a spring positioned beneath the cam and under the carriage-spring and provided with a set-screw, substantially as described.

4. In combination with a type-writer carriage adapted to be tilted up and disengaged from the feed mechanism, of a pivotally-supported key-bar, a series of keys mounted to slide in said key-bar and adapted to be actuated to throw the key-bar and to regulate the length of said throw, a rock-shaft connected to be actuated by operating said key-bar, a stepped stop mounted on said carriage, a pawl keyed to said rock-shaft and adapted to be actuated and engage said stepped stop, and means for tilting said carriage to disengage it from the feed mechanism, which is operated by the rock-shaft simultaneously with the pawl.

5. In combination with a type-writer carriage adapted to be tilted up and disengaged from the feed mechanism, of a pivotally-supported key-bar, a rock-shaft connected to be operated by actuating said key-bar, a cam having a flat face mounted on said rock-shaft and adapted to be actuated to tilt said carriage and disengage it from the feed mechanism, and a second cam mounted on said rock-shaft and adapted to be actuated to bear against the feed or carriage spring to retard the movement of the carriage after it has been released.

6. In combination with a type-writer carriage adapted to be tilted up and disengaged from its feed mechanism, of a rock-shaft, means for giving a series of throws of different lengths to said rock-shaft, corresponding to the different places of numeration, a stepped stop mounted on said carriage, a pawl keyed to said shaft and adapted to be actuated to engage the teeth on said stepped stop, and means for tilting the carriage to disengage it from the feed mechanism, which is actuated by said rock-shaft.

In testimony whereof I have hereunto set my hand in presence of two subscribing witnesses.

GILBERT H. IRISH.

Witnesses:
F. W. BARTLETT,
C. W. STARLING.